United States Patent [19]
Bosch

[11] 3,906,657
[45] Sept. 23, 1975

[54] PEST BIRD EXTERMINATING PERCH

[76] Inventor: Robert Bosch, Box 22, Muscatine, Iowa 52761

[22] Filed: Feb. 21, 1975

[21] Appl. No.: 551,730

[52] U.S. Cl. .................................. 43/131; 119/25
[51] Int. Cl.² ................................... A01M 25/00
[58] Field of Search ........... 43/131, 42, 74; 119/25, 119/26, 156; 211/178 R, 178 A

[56] References Cited
UNITED STATES PATENTS

| | | | |
|---|---|---|---|
| 2,169,499 | 8/1939 | Niemeyer | 119/25 |
| 3,146,546 | 9/1964 | Moore | 43/131 |
| 3,147,565 | 9/1964 | Moore | 43/131 |

Primary Examiner—Warner H. Camp
Attorney, Agent, or Firm—Victor J. Evans & Co.

[57] ABSTRACT

A pest bird exterminating perch for installation in areas infested with pest birds by temporarily or permanently erecting the perch on a post. The perch includes a plurality of horizontal members which can be folded together for storage and transport with each of the members containing a felt like material soaked with poison which kills the birds by being absorbed through the feet.

4 Claims, 3 Drawing Figures

US Patent   Sept. 23, 1975   3,906,657
FIG. 1.
FIG. 2.
FIG. 3.
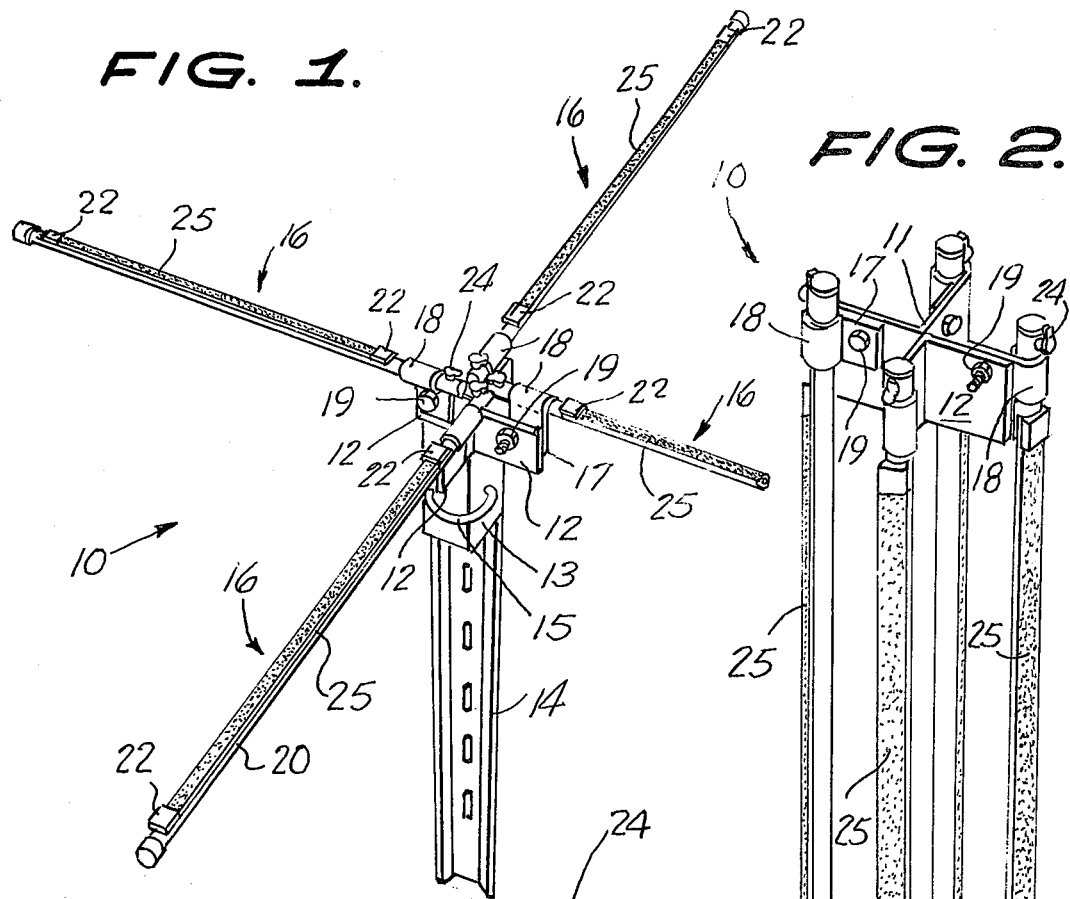
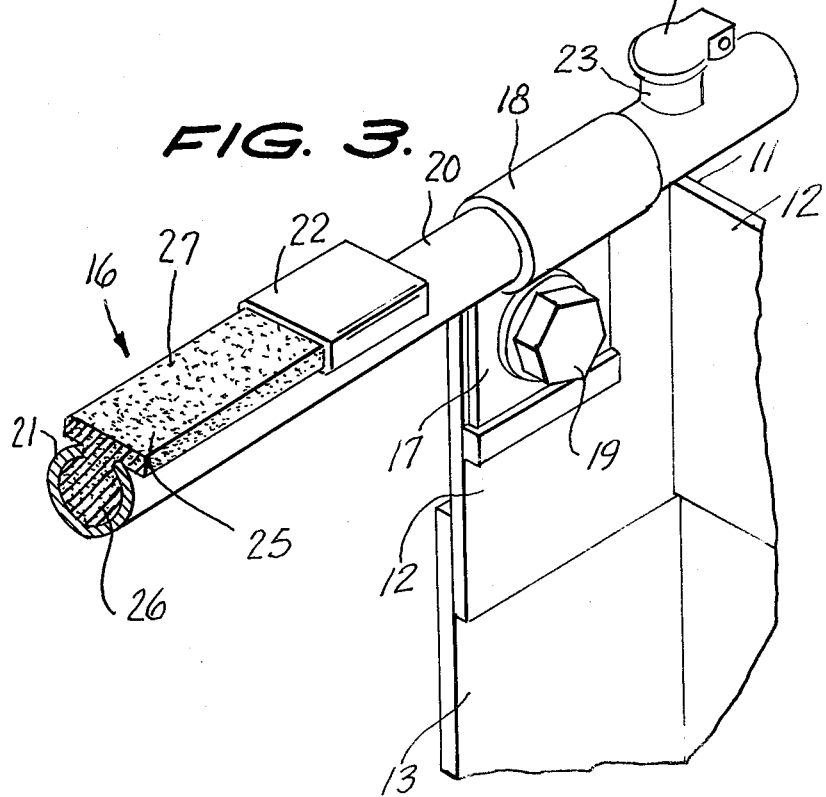

PEST BIRD EXTERMINATING PERCH

BACKGROUND OF THE INVENTION

1. Field of the Invention

The present invention relates to extermination of pest birds through a poison perch.

2. Summary of the Invention

The perch of the present invention includes a plurality of horizontal members which can be folded into close parallel relation parallel to a supporting pole for storage and shipment. Each of the perch members includes a tubular support for soft absorbent poison carrying material exposed on the upper surface of the perch for contact by the feet of the pest birds.

The primary object of the invention is to provide a perch which can be temporarily or permanently erected for exterminating pest birds.

Other objects and advantages will become apparent in the following specification when considered in light of the attached drawings.

BRIEF DESCRIPTION OF THE DRAWINGS

FIG. 1 is a perspective view of the invention;

FIG. 2 is a perspective view of the invention with the perches folded; and

FIG. 3 is an enlarged fragmentary perspective view of one perch attached to its support.

DESCRIPTION OF THE PREFERRED EMBODIMENT

Referring now to the drawings in detail wherein like reference characters indicates like parts throughout the several figures the reference numeral 10 indicates generally a foldup pest bird eradication perch assembly constructed in accordance with the invention.

The assembly 10 includes a bracket 11 having a plurality of generally flat arms 12 extending radially outwardly. An angle iron support 13 is adapted to be secured to the bracket 11 by any suitable means such as welding and a support 13 is adapted to be secured to the upper end of a post 14 by means of a U-bolt 15.

A plurality of perch members each generally indicated at 16 include a generally flat plate 17 having a hollow barrel 18 rigidly secured thereto. The plate 17 is pivotally secured to the members 12 of the bracket 11 by means of a pivot bolt and nut 19. The plate 17 is adapted to pivot around the bolt 19 so that the barrel 18 moves from a position with its axis horizontal to a position with its axis vertical.

Each of the perch members 16 include an elongate tube 20 closed at its opposite ends with the tube 20 extending through the barrel 18 as can be clearly seen in FIG. 3. The tube 20 is open at 21 throughout the major central portion of its length again as can be seen in FIG. 3 and is provided with a generally rectangular socket retainer member 22 at each end of the opening 21.

A filler neck 23 is secured to the tube 20 at the inner end thereof with the neck 23 closed by a spring cap 24. A wick generally indicated at 25 is positioned in the perch 16 and has a generally cylindrical portion 26 which is mounted in the tubular member 20 and also has a generally horizontal flat portion 27 which has its opposite ends secured by the socket members 22 with the central portion overlying the perch 16 as can be seen in FIG. 3.

In the use and operation of the invention bird eradication poison, of the type which can be absorbed through the feet of the bird, is flowed into the perch 16 through the neck 23 by opening the spring cap 24. When the wick 25 has become saturated with poison the perches 16 are extended to their generally horizontal position as illustrated in FIG. 1 and the post 14 is then positioned so as to bring the perch 10 into a location either inside or outside of the building convenient for the pest birds to perch thereon. Among the birds which have been declared pests by the United States Government to be eradicated with this invention are the English Sparrows, the pigeon, and the starling. When these birds alight on the perches 16 their feet become dampened with the poison and their death follows in a relatively short period of time.

Having thus described the preferred embodiment of the invention it should be understood that numerous structural modifications and adaptations may be resorted to without departing from the spirit of the invention.

What is claimed is:

1. A folding perch for eradication of pest birds including a bracket having a plurality of upright radially extending plates, elongate tubular perch members, means pivotally securing one of said perch members to each of said radially extending plates of said bracket for movement of said perch from a generally horizontal position to a generally vertical position, each of said tubular perch members having an opening formed in the upper surface thereof intermediate its opposite ends, an absorbent wick mounted in said perch tube and extending upwardly through the opening therein for engaging the feet of birds, a filler neck formed on said perch tube, and means closing said filler neck.

2. A device as claimed in claim 1 including a pair of generally rectangular socket retainer members secured to said perch tube at each end of said opening for receiving the opposite ends of said wick.

3. A device as claimed in claim 1 wherein the means for pivotally securing said perch tube to said bracket includes a plate, means securing said plate to said bracket for pivotal movement thereon, and a barrel rigidly secured to said plate and encompassing said tube.

4. A device as claimed in claim 1 wherein the means closing said filler neck includes a spring cap.

* * * * *